Oct. 22, 1929.  I. KOECHLIN  1,732,562
VEHICLE BRAKE
Filed Feb. 14, 1925   3 Sheets-Sheet 1

INVENTOR:
Isaac Koechlin
BY: [signature]
ATTORNEY

Oct. 22, 1929.  I. KOECHLIN  1,732,562
VEHICLE BRAKE
Filed Feb. 14, 1925  3 Sheets-Sheet 2

INVENTOR:
Isaac Koechlin
BY
ATTORNEY

Oct. 22, 1929.　　　　I. KOECHLIN　　　　1,732,562
VEHICLE BRAKE
Filed Feb. 14, 1925　　　3 Sheets-Sheet 3

INVENTOR:
Isaac Koechlin
BY Francis E. Boyce
ATTORNEY

Patented Oct. 22, 1929

1,732,562

UNITED STATES PATENT OFFICE

ISAAC KOECHLIN, OF LEVALLOIS-PERRET, FRANCE, ASSIGNOR TO SOCIETE ANONYME DES AUTOMOBILES ET CYCLES PEUGEOT, OF LEVALLOIS-PERRET, FRANCE

VEHICLE BRAKE

Application filed February 14, 1925, Serial No. 9,073, and in France March 31, 1924.

The invention relates to brakes embodying rigid shoes and means whereby the pivots of said shoes may be shifted away from one another so as to compensate for the wear of the frictional facing.

In the known devices of this kind, no means are provided for shifting the pivots of the brake shoes concentrically with the brake drum so that the adjustment produces an uneven wear, resulting within short time in a reduced braking pressure, due to the decreasing operative surface.

The primary object of the invention consists in providing a device affording the adjustment of the brake shoes in order to compensate for the wear of the facing while preserving a concentric and uniform pressure and, with this object in view, the invention resides in the provision of means whereby the pivoting ends of the brake shoes are supported in an adjustable manner by a stationary member secured to the wheel axle and may be shifted concentrically with the brake drum for taking up the wear of said shoes.

The appended drawings which are given by way of example, illustrate various embodiments of the invention.

Figure 1:
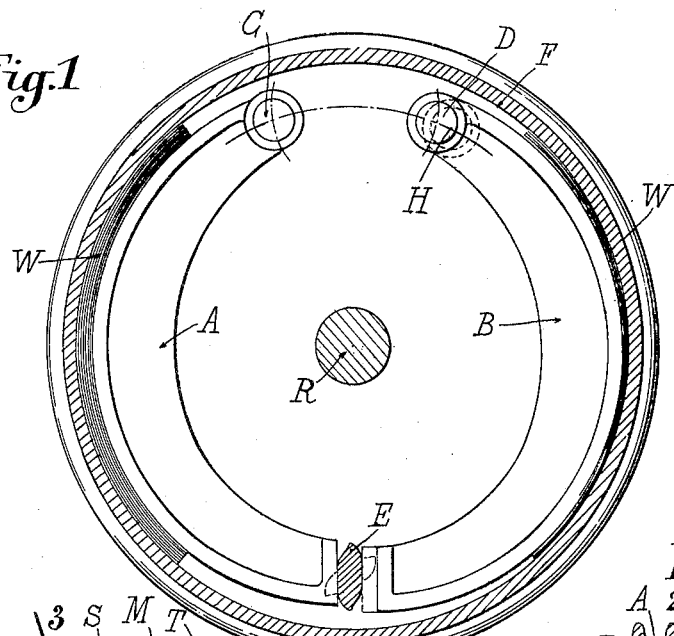
Fig. 1 is a section at right angle to the axis of the brake drum illustrating the principle of the invention.

The internal-expanding brake shown in Fig. 1 comprises as usual two shoes A, B, which are respectively pivoted to stationary pivots C, D; said shoes are provided with a facing W and are operated by the cam E or by a wedge of suitable outline, so as to engage the inner surface of the brake drum F.

When the facing W becomes worn down and its thickness is reduced to such an extent that the braking pressure is insufficient, it becomes necessary to adjust the device. This is done, according to the invention, by displacing the pivot D of one shoe relatively to the other, along a circle described about the centre of the brake drum in order to preserve the frictional contact of the shoes with the brake drum throughout the whole periphery of the shoes.

Figure 2:
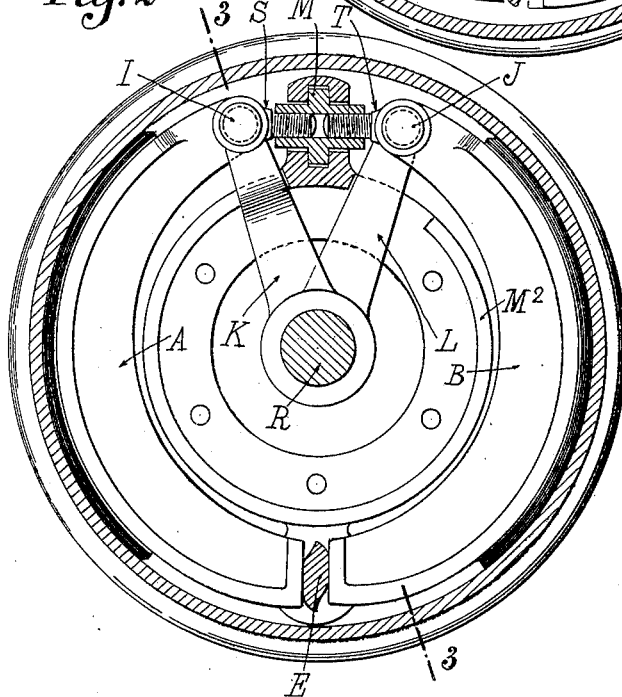
Fig. 2 is a view similar to Fig. 1 showing a first embodment of the invention and taken approximately on the line 2—2 of Fig. 3.
Figure 3:
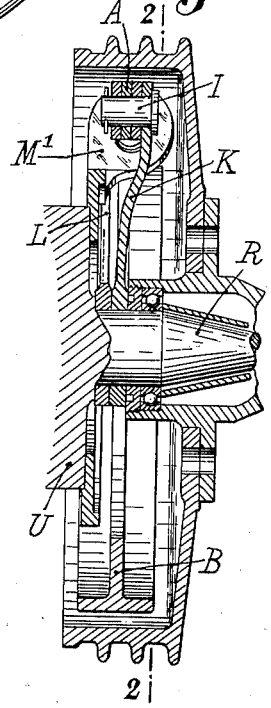
Fig. 3 is an axial section on the line 3—3 of Fig. 2.

This adjustment may be performed in practice as shown in Figs. 2 and 3. The pivots I and J for the shoes are mounted on links K and L rotatably supported by the wheel axle or swivel R, and also extend through the forked end of screwthreaded rods S, T, which straddle the end of shoes A and B respectively. The screwthreaded rods S and T engage an adjusting nut M having right and left hand threads, and rotatably supported in a housing $M^1$ formed on an annular member $M^2$ secured to the swivel knuckle U or similar part.

Figure 4:
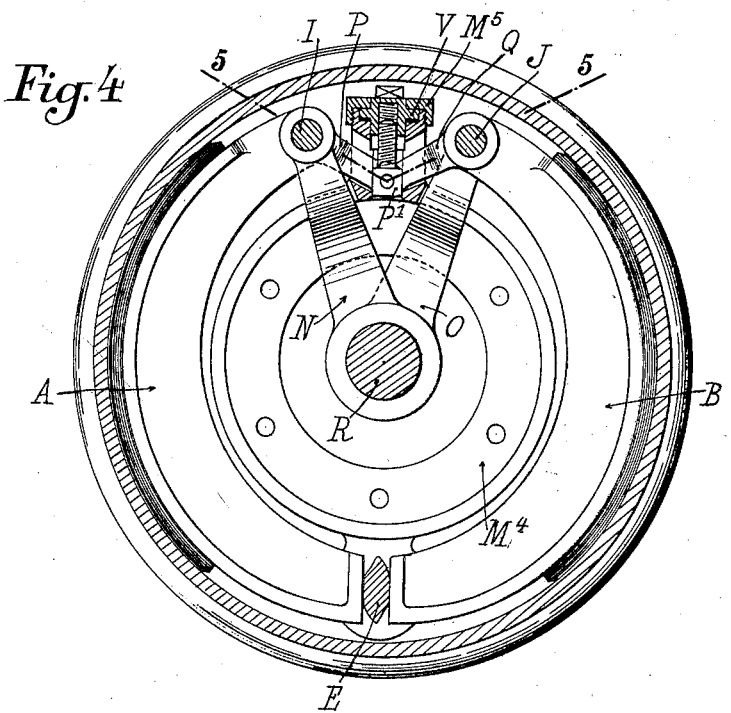
Fig. 4 is a section similar to Fig. 2, on the line 4—4 of Fig. 5, showing a modification.
Figure 5:
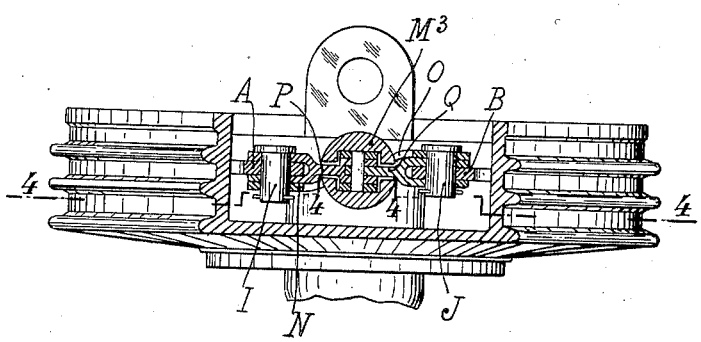
Fig. 5 is a plan view of the brake shown in Fig. 4, with parts in section on the line 5—5 of Fig. 4.

Figs. 4 and 5 show a modification in which the pivots I and J are connected to the respective links N and O mounted as above on the axle pin or swivel R, and also to the forked ends of links P and Q pivoted to the square forked head $P^1$ of a screwthreaded rod engaging a nut V. Said nut is rotatably supported in a housing $M^3$ of a member $M^4$ similar to member $M^2$ of Figs. 2 and 3. A cap $M^5$ is screwed on housing $M^3$, the latter being suitably slotted in order to allow the free oscillation of links P and Q.

Figure 6:
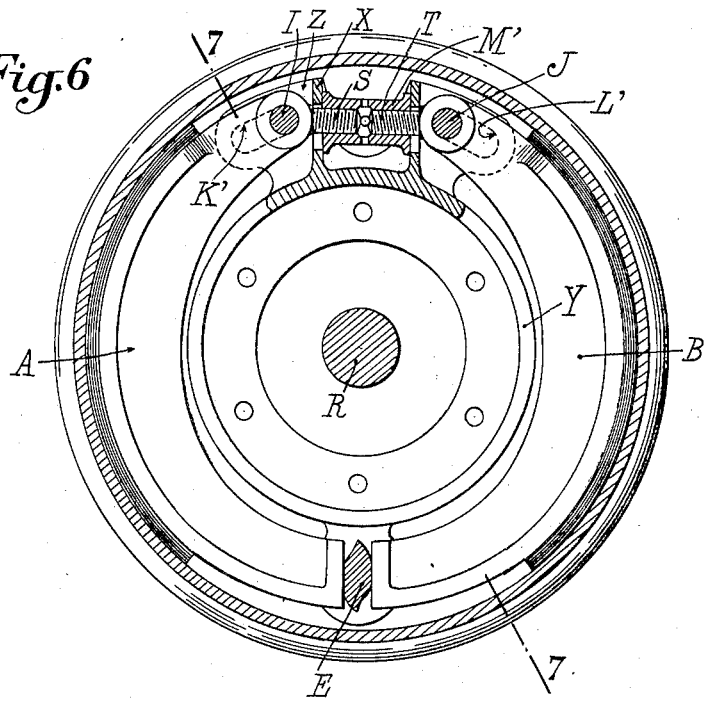
Fig. 6 is a section similar to Fig. 4 of a further modification, on the line 6—6 of Fig. 7.
Figure 7:
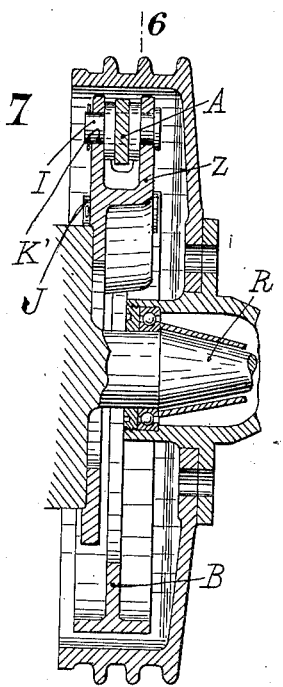
Fig. 7 is a section on the line 7—7 of Fig. 6.

In Figs. 6 and 7, the links K and L (Fig. 2) or N and O (Fig. 3) are replaced by the circular grooves $K'$ $L'$ concentric with the brake drum and formed in web extensions Z of a member X formed on a member Y similar to member $M^2$ of Figs. 2 and 3. The arrangement for shifting the pivots I and J from each other consists of screwthreaded rods S, T, having forked ends straddling the ends of the brake shoes and whose inner threaded ends are screwed into a sleeve $M'$ with right and left hand threads and rotatably supported by member X, the latter having elongated apertures through which extend the rods S and T.

Obviously, the hereinbefore described arrangements are given solely by way of example, and the same are applicable with equal facility to brakes upon front wheels and upon rear wheels.

Having now described my invention, what I claim as new and desire to secure by Letters Patent is:

1. In an internal-expanding brake comprising a brake drum rotatably mounted on a stationary pivot, a braking member, a pivot pin for supporting one end of said braking member, and brake applying means cooperating with said braking member, means rigidly secured to said stationary pivot for adjustably supporting said pivot pin and means for shifting said pivot pin concentrically with the brake drum.

2. In an internal-expanding brake comprising a brake drum rotatably mounted on a stationary pivot, a braking member, a pivot pin for supporting one end of said braking member, and brake applying means cooperating with said braking member, means connected to said stationary pivot for holding said pivot pin at a constant distance from the axis of the brake drum and means for shifting said pivot pin about said axis.

3. In an internal-expanding brake comprising a brake drum rotatably mounted on a stationary pivot the combination of pivot pins on which the pivoting ends of the brake shoes are respectively mounted, links pivoted at their outer end respectively to said pivot pins and at their inner end to said stationary pivot, links pivoted at one end respectively to said pivot pins and at the other end to each other, a member rigidly secured to said stationary pivot, an adjustable screw and nut connection connecting the joint of said latter links upon each other to said member and means for operating one element of said screw and nut connection.

4. In an internal-expanding brake comprising a brake drum rotatably mounted on a stationary pivot the combination of pivot pins on which the pivoting ends of the brake shoes are respectively mounted, connecting means adapted to be extended and contracted at will between said pivot pins, means for holding said pivot pins at a constant distance from the axis of the brake drum and means for actuating at will said extensible and contractable connecting means.

5. In an internal-expanding brake as claimed in claim 4, the further feature residing in the provision of adjustable cooperating male and female threaded elements, whereof one element is fixed to said stationary pivot, for extending and contracting at will said connecting means.

6. In an internal-expanding brake comprising a brake drum rotatably mounted on a stationary pivot, the combination of pivot pins on which the pivoting ends of the brake shoes are respectively mounted, connecting means adapted to be extended and contracted at will between said pivot pins, links pivoted at their outer end respectively to said pivot pins and at their inner end to said stationary pivot, and means for actuating at will said extensible and contractable connecting means.

7. In an internal expanding brake comprising a brake drum rotatably mounted on a stationary pivot, the combination of pivot pins on which the pivoting ends of the brake shoes are respectively mounted, toggle means connecting said pivot pins, means for holding said pivot pins at a constant distance from the axis of the brake drum, means including an adjustable screw and nut connection for connecting the common pivot of said toggle means to said stationary pivot and means for operating one element of said screw and nut connection.

In testimony whereof I have signed my name to this specification.

ISAAC KOECHLIN.